United States Patent
Nishimura et al.

(10) Patent No.: US 8,823,671 B2
(45) Date of Patent: Sep. 2, 2014

(54) DISPLAY DEVICE WITH TOUCH SENSOR

(75) Inventors: Tomohiko Nishimura, Osaka (JP); Jin Miyazawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 165 days.

(21) Appl. No.: 13/636,722

(22) PCT Filed: Mar. 24, 2011

(86) PCT No.: PCT/JP2011/057218
§ 371 (c)(1),
(2), (4) Date: Sep. 24, 2012

(87) PCT Pub. No.: WO2011/125521
PCT Pub. Date: Oct. 13, 2011

(65) Prior Publication Data
US 2013/0021283 A1    Jan. 24, 2013

(30) Foreign Application Priority Data
Apr. 1, 2010   (JP) .................................. 2010-085481

(51) Int. Cl.
*G06F 3/041* (2006.01)
*G06F 3/044* (2006.01)
*G09G 3/36* (2006.01)

(52) U.S. Cl.
CPC ............ *G06F 3/0416* (2013.01); *G09G 3/3655* (2013.01); *G09G 2330/06* (2013.01); *G06F 3/044* (2013.01)
USPC ....................................... 345/173; 178/18.01

(58) Field of Classification Search
USPC ........................................ 345/173; 178/18.01
See application file for complete search history.

(56) References Cited

U.S. PATENT DOCUMENTS 8,284,169 B2 * 10/2012 Nagata et al. ................. 345/174
8,314,779 B2 * 11/2012 Chan et al. .................... 345/174
(Continued)

FOREIGN PATENT DOCUMENTS

JP    2006-146895 A    6/2006
JP    2007-139817 A    6/2007
(Continued)

OTHER PUBLICATIONS

Official Communication issued in International Patent Application No. PCT/JP2011/057218, mailed on May 24, 2011.

(Continued)

*Primary Examiner* — Abbas Abdulselam
(74) *Attorney, Agent, or Firm* — Keating & Bennett, LLP (57) ABSTRACT

Provided is a display device with a touch sensor that can avoid the influence of noise originating from the polarity inversion of a common voltage of the display device without using special circuitry. The display device with a touch sensor includes a sensor output readout circuit (21) that is sequentially connected to multiple sensor electrodes in a touch sensor unit (7) and outputs signal voltages that correspond to the electrical characteristics of the electrodes, a sensor control circuit (23) that supplies a control signal to the sensor output readout circuit (21), and a coordinate computation circuit (22) that detects a contact position based on the signal voltages. The sensor control circuit (23) causes a scan operation, in which the sensor output readout circuit (21) is sequentially connected to all of the sensor electrodes of the touch sensor unit (7) and outputs the signal voltages, to start after the common voltage has switched from a first polarity to a second polarity, and to end before the common voltage returns to the first polarity.

3 Claims, 7 Drawing Sheets (56) References Cited

U.S. PATENT DOCUMENTS

| | | | |
|---|---|---|---|
| 8,619,054 B2 * | 12/2013 | Philipp et al. | 345/174 |
| 2007/0262966 A1 | 11/2007 | Nishimura et al. | |
| 2009/0115737 A1 | 5/2009 | Toyoshima | |

FOREIGN PATENT DOCUMENTS

| | | |
|---|---|---|
| JP | 2007-271781 A | 10/2007 |
| JP | 2009-116489 A | 5/2009 |
| JP | 2009-146173 A | 7/2009 |
| JP | 2009-211527 A | 9/2009 |
| JP | 2009-294903 A | 12/2009 |

OTHER PUBLICATIONS

Nishimura et al.; "Touch-Sensor-Equipped Display Device"; U.S. Appl. No. 13/636,724, filed Sep. 24, 2012.

* cited by examiner

000# DISPLAY DEVICE WITH TOUCH SENSOR

TECHNICAL FIELD

The present invention relates to a display device that includes a touch sensor that can detect a position where a finger or the like came into contact.

BACKGROUND ART

Display devices with a touch sensor, in which a touch sensor (also called a "touch panel") is provided on the front face (observer side) of a display, have conventionally been used in various applications. A touch sensor is an input device that enables operation instructions to be given and data to be input by detecting the position of a place where a finger, pen, or the like came into contact. Examples of known systems for position detection include a capacitive coupling system, a resistive film system, an infrared system, an ultrasonic system, and an electromagnetic induction/coupling system.

When a touch sensor that is integrated with a display device is used, the problem of a reduction in the precision of position detection by the touch sensor occurs due to the touch sensor being subjected to noise from the display device. For example, when a liquid crystal panel is used as the display device, induced voltage is generated in the conductive films for position detection of the touch sensor due to the common voltage that is applied to the counter electrode of the liquid crystal panel. This induced voltage is a cause for noise.

A configuration for removing this kind of noise is disclosed in JP 2006-146895A, for example. The display device with a touch sensor disclosed in this patent literature includes a strobe signal generation circuit and a noise-removed current signal generation circuit. The strobe signal generation circuit generates a strobe signal that is synchronized with the cycle of the polarity inversion of the common voltage that is supplied to the counter electrode. The noise-removed current signal generation circuit generates a noise-removed current signal by, based on the strobe signal, removing a predetermined portion from the current flowing from the terminal that is connected to the touch sensor unit.

According to this conventional configuration, a strobe signal is used to remove noise that appears in the output current of the conductive films for position detection due to the cyclical polarity inversion of the common voltage. This improves the SN ratio of the touch sensor output and improves the precision of position detection.

However, the above-described conventional configuration has a complicated structure due to requiring dedicated circuits for noise removal, namely the strobe signal generation circuit and the noise-removed current signal generation circuit.

DISCLOSURE OF INVENTION

An object of the present invention is to provide a display device with a touch sensor that can avoid the influence of noise originating from the polarity inversion of a common voltage of the display device without using a strobe signal generation circuit or a noise-removed current signal generation circuit.

In order to achieve the above-described object, a display device with a touch sensor that is disclosed here includes: a display panel that has an active matrix substrate in which a plurality of pixel electrodes are provided, a display medium layer, and counter substrate in which a counter electrode that opposes the plurality of pixel electrodes is provided; a display panel driving circuit that supplies a display signal voltage to the plurality of pixel electrode and supplies a common voltage that undergoes cyclical polarity inversion to the counter electrode; a touch sensor unit that is disposed on a surface of the display panel on the counter substrate side and includes a plurality of sensor electrodes, an electrical characteristic of the sensor electrodes changing when touched by a contact body; a sensor output readout circuit that is sequentially connected to each of the sensor electrodes and outputs signal voltages that correspond to the electrical characteristics of the connected sensor electrodes; a sensor control circuit that supplies a control signal to the sensor output readout circuit; and a coordinate computation circuit that detects a position in the touch sensor unit that was touched by the contact body based on the signal voltages output from the sensor output readout circuit, wherein the sensor control circuit causes a scan operation, in which the sensor output readout circuit is sequentially connected to all of the sensor electrodes of the touch sensor unit and outputs the signal voltages, to start after the common voltage has switched from a first polarity to a second polarity, and to end before the common voltage returns to the first polarity.

According to the present invention, it is possible to provide a display device with a touch sensor that can avoid the influence of noise originating from the polarity inversion of the common voltage of the display device without using special circuits such as a strobe signal generation circuit and a noise-removed current signal generation circuit.

DESCRIPTION OF THE INVENTION

A display device with a touch sensor according to an embodiment of the present invention includes: a display panel that has an active matrix substrate in which a plurality of pixel electrodes are provided, a display medium layer, and a counter substrate in which a counter electrode that opposes the plurality of pixel electrodes is provided; a display panel driving circuit that supplies a display signal voltage to the plurality of pixel electrode and supplies a common voltage that undergoes cyclical polarity inversion to the counter electrode; a touch sensor unit that is disposed on a surface of the display panel on the counter substrate side and includes a plurality of sensor electrodes, an electrical characteristic of the sensor electrodes changing when touched by a contact body; a sensor output readout circuit that is sequentially connected to each of the sensor electrodes and outputs signal voltages that correspond to the electrical characteristics of the connected sensor electrodes; a sensor control circuit that supplies a control signal to the sensor output readout circuit; and a coordinate computation circuit that detects a position in the touch sensor unit that was touched by the contact body based on the signal voltages output from the sensor output readout circuit, wherein the sensor control circuit causes a scan operation, in which the sensor output readout circuit is sequentially connected to all of the sensor electrodes of the touch sensor unit and outputs the signal voltages, to start after the common voltage has switched from a first polarity to a second polarity, and to end before the common voltage returns to the first polarity.

According to this configuration, the scan operation in which the sensor output readout circuit sequentially connects to all of the sensor electrodes of the touch sensor unit and outputs the signal voltages is caused to start after the common voltage has switched from the first polarity to the second polarity, and to end before the common voltage returns to the first polarity, and therefore the scan operation and the polarity inversion of the common voltage do not occur at the same time. This enables removing noise that accompanies the polarity inversion of the common voltage without using dedicated circuitry for noise removal.

According to the above configuration, it is possible to provide a display device with a touch sensor that can avoid the influence of noise originating from the polarity inversion of the common voltage of the display device without using special circuits such as a strobe signal generation circuit and a noise-removed current signal generation circuit.

Also, the display device with a touch sensor according to the above embodiment may be configured such that the polarity of the common voltage inverts once each horizontal period, or may be configured such that the polarity of the common voltage inverts once every two horizontal periods.

Also, in the display device with a touch sensor according to the above embodiment, it is preferable that the sensor electrodes include a first sensor electrode group in which a plurality of sensor electrodes are aligned in a first axis direction with respect to coordinates in the touch sensor unit, and a second sensor electrode group in which a plurality of sensor electrodes are aligned in a second axis direction with respect to coordinates in the touch sensor unit, and the coordinate computation circuit determines a coordinate in the first axis direction of the position touched by the contact body based on the signal voltages that were output when the sensor output readout circuit was connected to the sensor electrodes that belong to the first sensor electrode group, and determines a coordinate in the second axis direction of the position touched by the contact body based on the signal voltages that were output when the sensor output readout circuit was connected to the sensor electrodes that belong to the second sensor electrode group.

Embodiment

Embodiments of the present invention are described in detail below with reference to the drawings. The same reference signs are used for corresponding portions in the drawings, and redundant descriptions will not be given for them.

Figure 1:
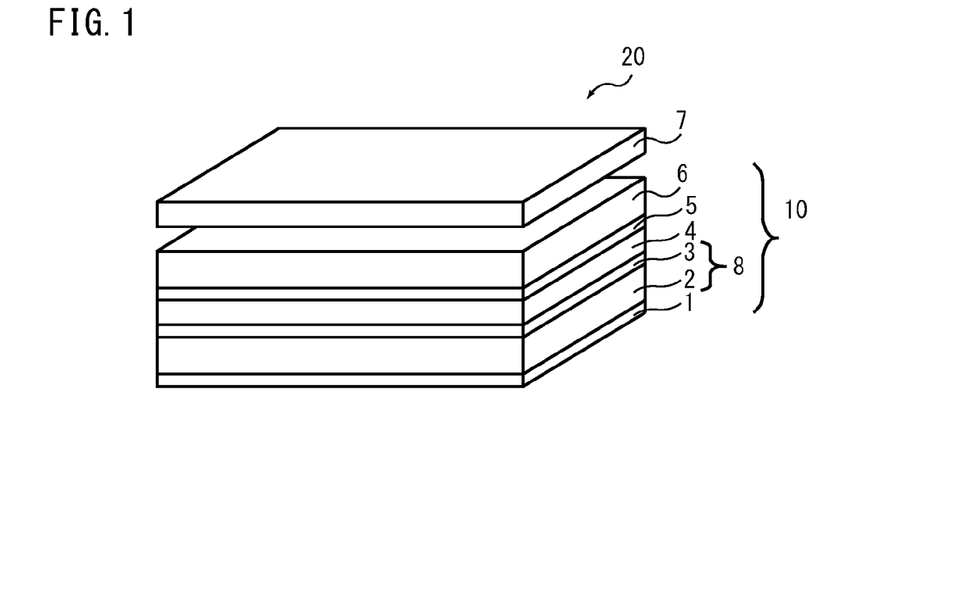
FIG. 1 is a schematic diagram showing the configuration of a display device with a touch sensor according to an embodiment of the present invention.
Figure 2:
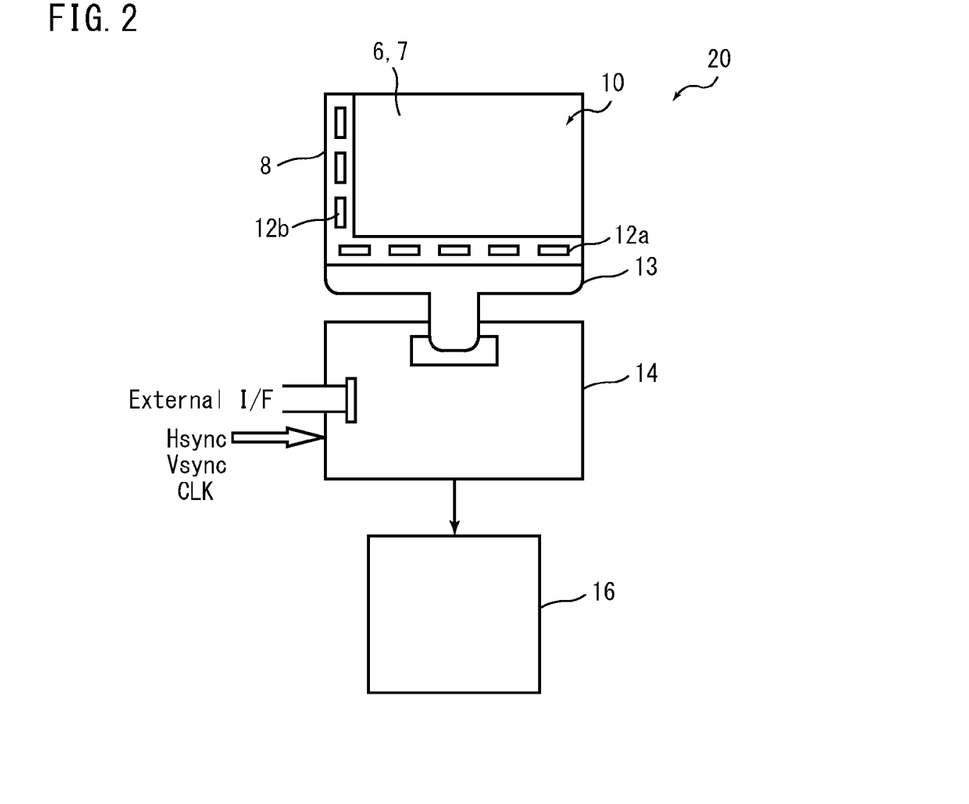
FIG. 2 is a schematic diagram showing particularly the connection relationship with a driving circuit and the like in the configuration of a display device with a touch sensor according to a first embodiment of the present invention.

FIGS. 1 and 2 are schematic diagrams showing the configuration of a display device with a touch sensor 20 according to a first embodiment of the present invention.

As shown in FIGS. 1 and 2, the display device with a touch sensor 20 includes an active matrix (e.g., TFT) display panel 10, a touch sensor unit 7, a driving circuit 14 that supplies various types of signals to the display panel 10, and a touch sensor circuit 16.

The driving circuit 14 is connected to a source driver 12a and a gate driver 12b via an FPC (flexible circuit substrate) 13. The source driver 12a and the gate driver 12b may be mounted as chips on an active matrix substrate 8 of the display panel 10, or may be formed monolithically on the active matrix substrate 8.

The driving circuit 14 receives a video signal, a horizontal synchronization signal $H_{SYNC}$, a vertical synchronization signal $V_{SYNC}$, a clock signal CLK (pixel clock), and the like via an external interface (I/F). Note that if the video signal is an analog signal, the clock signal CLK may be generated within the driving circuit 14 by a PLL circuit, for example. The vertical synchronization signal $V_{SYNC}$, the horizontal synchronization signal $H_{SYNC}$, and, when necessary, the clock signal CLK are supplied to the touch sensor circuit 16 either via the driving circuit 14 or directly from the outside.

The display panel 10 has at least the active matrix substrate 8, a counter substrate 6, and a display medium layer 4 disposed between these substrates.

The active matrix substrate 8 has a glass substrate 2 and a TFT array layer 3 thereon that includes switching elements such as TFTs, wiring, and the like. The active matrix substrate 8 also has multiple pixel electrodes that are arranged in a matrix. The display medium layer 4 is a liquid crystal layer, for example. The counter substrate 6 has color filters (not shown) and a counter electrode 5 that is formed over the entire surface of the substrate. Note that if the display panel 10 is a display panel in which liquid crystal or the like is used as the display medium layer 4, and display control is performed using polarization, a polarizing plate is provided on at least one of the surfaces of the display panel 10. In the configuration example in FIG. 1, a first polarizing plate 1 (polarizer) is provided on the back face side (side opposite to the observer) of the active matrix substrate 8. Note that the depending on the type of polarization, a second polarizing plate (not shown) serving as an analyzer may be provided on the counter substrate 6 side.

Note that although the display panel 10 is provided with color filters and the second polarizing plate in the above description, a configuration is possible in which the color filters and the second polarizing plate are disposed on the observer side of the touch sensor unit 7. Additionally, the display panel 10 is provided with various types of optical members such as a phase difference plate and a lens sheet as necessary.

The touch sensor unit 7 is disposed on the front face (observer side) of the display panel 10. The touch sensor unit 7 has a touch sensor substrate constituted from glass, transparent plastic, or the like, and transparent conductive films provided on the surface of the touch sensor substrate. Although described in detail later, the transparent conductive films are formed in predetermined patterns using a known thin-film formation technique such as a sputtering method. The transparent conductive films are constituted by a material such as indium tin oxide (ITO), indium zinc oxide (IZO), tin oxide (NESA), or zinc oxide. In order to obtain transparent conductive films that have favorable heat resistance and durability, it is preferable that film formation is performed through a sputtering method using a target that contains Mg. However, the material of the transparent conductive films and the film formation method are not particularly limited to the examples described here, and various types of materials and film formation methods can be used.

The touch sensor unit 7 may be adhered to the surface of the display panel 10 without a gap using an adhesive or the like, or may be attached thereto with a gap (air layer) provided therebetween. At this time, the transparent conductive films of the touch sensor unit 7 may be disposed on the display panel 10 side, or conversely, the touch sensor substrate may be disposed on the display panel 10 side.

Note that the touch sensor unit 7 may be configured so as to not have the touch sensor substrate. In this case, the touch sensor unit 7 can be realized by directly forming the transparent conductive films on the outer face of the display panel 10 on the observer side. This configuration has the advantage of being able to reduce the overall thickness of the display device with a touch sensor.

Regardless of whether the touch sensor substrate is provided or not provided, it is preferable that a protective layer is formed on the outermost surface of the touch sensor unit 7 on the observer side. The protective layer can be, for example, an inorganic thin-film made of $SiO_2$, $SiNO_X$, or the like, a transparent resin coating film, or a transparent resin film made of PET, TAC, or the like. The touch sensor unit 7 may furthermore be subjected to anti-reflective processing and/or anti-soiling processing as necessary.

In the present embodiment, an active matrix (e.g., TFT) liquid crystal display panel is used as the display panel 10. In the display panel 10, the polarity of a common voltage that is supplied to the counter electrode 5 of the counter substrate 6 is inverted once in a certain cycle (e.g., 1 horizontal synchronization period). This is done in order to prevent a DC voltage from being applied to the liquid crystal layer serving as the display medium layer 4, and to lower the withstanding pressure that the gate driver and source driver are required to have.

Figure 3:
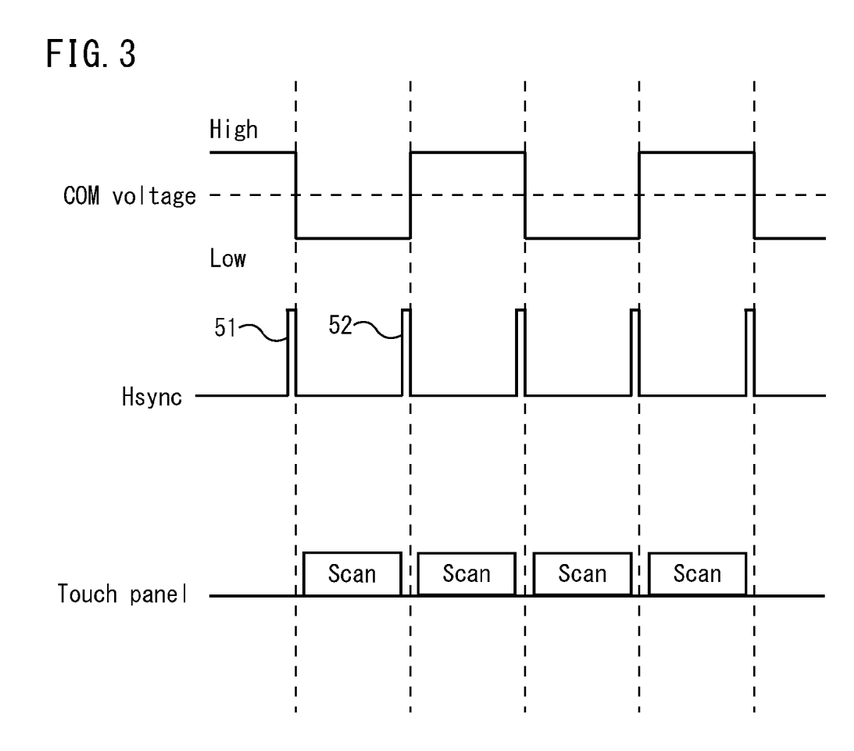
FIG. 3 is a timing chart showing the relationship between a common voltage (COM voltage) that is applied to a counter electrode of a display panel, a horizontal synchronization signal, and a scan operation in a touch sensor circuit.

FIG. 3 is a diagram showing an example of change over time in the common voltage (COM voltage) that is applied to the counter electrode 5 of the display panel 10. FIG. 3 shows the example of so-called line inversion driving in which the polarity of the common voltage (positive and negative) inverts once in each horizontal synchronization period. However, the present invention is not limited to this and can also be applied to, for example, so-called two line inversion driving in which the polarity of the common voltage inverts once every two horizontal synchronization periods. Note that FIG. 3 shows an example of a common voltage waveform in which the absolute value of the positive-polarity voltage and the absolute value of the negative-polarity voltage of the common voltage are the same as each other. However, in the case of a TFT liquid crystal panel, for example, the absolute value of the positive-polarity voltage and the absolute value of the negative-polarity voltage of the common voltage are not necessary the same.

As shown in FIG. 3, the polarity of the common voltage inverts from positive to negative or from negative to positive in synchronization with the falling edge (switch from high level to low level) of the horizontal synchronization signal ($H_{SYNC}$). Note that when the polarity of the common voltage that is supplied to the counter electrode 5 switches from positive to negative or from negative to positive in this way, an induced voltage is generated in the touch sensor unit 7 and becomes a noise component in the touch sensor output.

In the present embodiment, in order to avoid influence from the polarity inversion of the common voltage, as shown in FIG. 3, the scan operation for scanning the electrode patterns (sensor electrodes) in the touch sensor unit 7 is started after one falling edge of the horizontal synchronization signal, and ended before the next rising edge of the horizontal synchronization signal, in order to avoid the timing of the polarity inversion of the common voltage. This scan operation will be described in detail later.

Figure 4A:
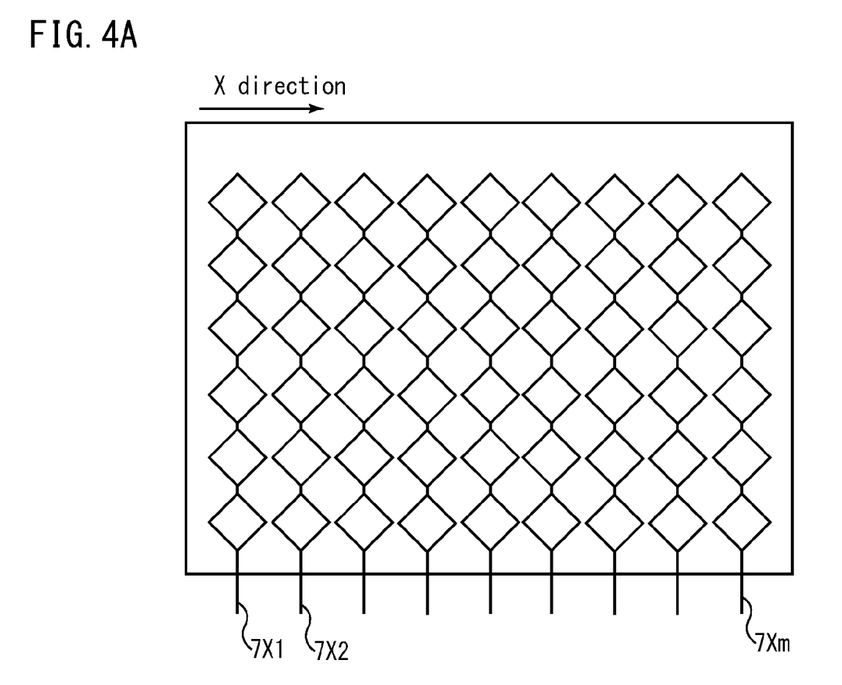
FIG. 4A is a schematic diagram showing an example of the configuration of, among the transparent conductive films of a touch sensor unit, only transparent conductive films for detecting a touch position in the X direction.
Figure 4B:
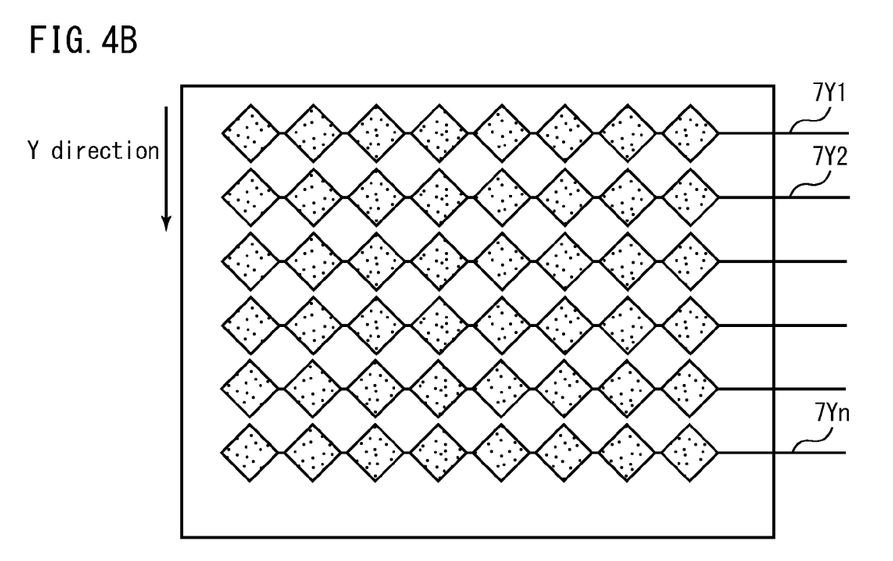
FIG. 4B is a schematic diagram showing an example of the configuration of, among the transparent conductive films of the touch sensor unit, only transparent conductive films for detecting a touch position in the Y direction.
Figure 4C:
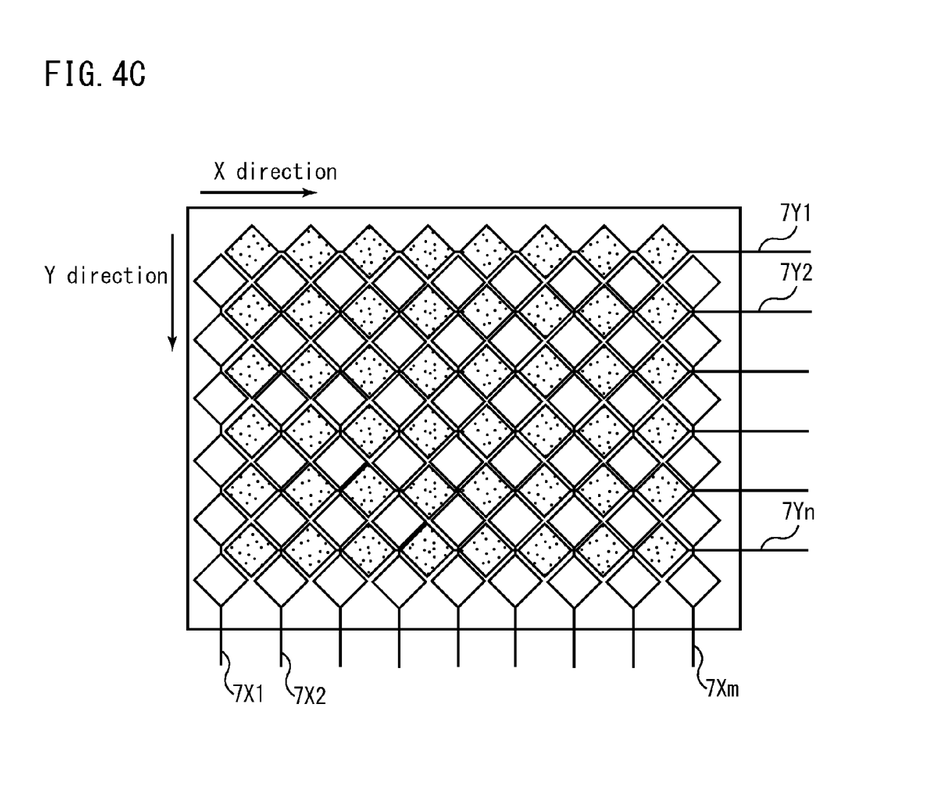
FIG. 4C is a schematic diagram showing the overall configuration of the transparent conductive films of the touch sensor unit.

Next is a further detailed description of the configuration of the touch sensor unit 7 of the present embodiment and driving operations thereof. In the following description, the X direction is the lengthwise direction of the touch sensor unit 7, and the Y direction is the direction that is orthogonal thereto. FIG. 4A is a schematic diagram showing an example of the configuration of, among the transparent conductive films of the touch sensor unit 7, only transparent conductive films for detecting a touch position in the X direction. FIG. 4B is a schematic diagram showing an example of the configuration of, among the transparent conductive films of the touch sensor unit 7, only transparent conductive films for detecting a touch position in the Y direction. FIG. 4C is a schematic diagram showing the overall configuration of the transparent conductive films in the touch sensor unit 7. Note that in FIGS. 4B and 4C, the transparent conductive films for detecting a touch position in the Y direction have been marked with a dotted pattern for the sake of convenience in making them easier to distinguish from the transparent conductive films in the X direction. In other words, the transparent electrode films do not necessarily actually have such a pattern.

As shown in FIGS. 4A and 4B, the touch sensor unit 7 has m electrode patterns 7X1, 7X2, . . . 7Xm (first sensor electrode group) in the X direction, and n electrode patterns 7Y1, 7Y2, . . . 7Yn (second sensor electrode group) in the Y direction. Note that although the illustrations have been simplified in order to facilitate understanding in FIG. 4A and the like, the number of electrode patterns (m and n) that the touch sensor unit 7 is actually provided with is determined according to the sensor resolution that the touch sensor unit 7 is required to have. The touch sensor unit 7 of the present embodiment determines the X coordinate of a touch position using the electrode patterns 7X1, 7X2, . . . 7Xm, and determines the Y coordinate of the touch position using the electrode patterns 7Y1, 7Y2, . . . 7Yn. Accordingly, it is preferable that the electrode patterns are disposed with a density according to which, when touched by a contact object such as a finger or a pen, that contact object simultaneously touches at least one of the X-direction electrode patterns 7X1, 7X2, . . . 7Xm and at least one of the Y-direction electrode patterns 7Y1, 7Y2, . . . 7Yn.

As shown in FIGS. 4A and 4B, the electrode patterns 7X1 to 7Xm and the electrode patterns 7Y1 to 7Yn are each a pattern in which multiple conductive films that have been patterned into rectangular shapes are connected in series via conductive wiring such that vertices of the rectangles oppose each other. Note that the conductive wiring may be formed from the same material as that of the conductive films, or may be formed from another conductive material. As shown in FIG. 4C, the conductive wiring is drawn out to the exterior of the touch sensor unit 7 and connected to a sensor output readout circuit that will be described later.

In the example shown in FIG. 4C, the rectangular portions of the X-direction electrode patterns 7X1, 7X2, . . . 7Xm and the rectangular portions of the Y-direction electrode patterns 7Y1, 7Y2, . . . 7Yn are disposed so as to not overlap each other. Note that an insulating film is disposed between the conductive wiring for the electrode patterns 7X1, 7X2, . . . 7Xm and the conductive wiring for the electrode patterns 7Y1, 7Y2, . . . 7Yn such that the X-direction conductive wiring and the Y-direction conductive wiring are not electrically connected at intersecting portions between them.

Note that the configuration of the conductive films of the touch sensor unit 7 is not limited to the example shown in FIG. 4C. For example, the X-direction electrode patterns and the Y-direction electrode patterns may be configured such that there is overlapping with each other. In this case, the X-direction electrode patterns and the Y-direction electrode patterns need only be formed in different layers with an insulating film layer therebetween. Alternatively, insulating films may be provided between the X-direction electrode patterns and the Y-direction electrode patterns at least at places where they overlap.

Figure 5:
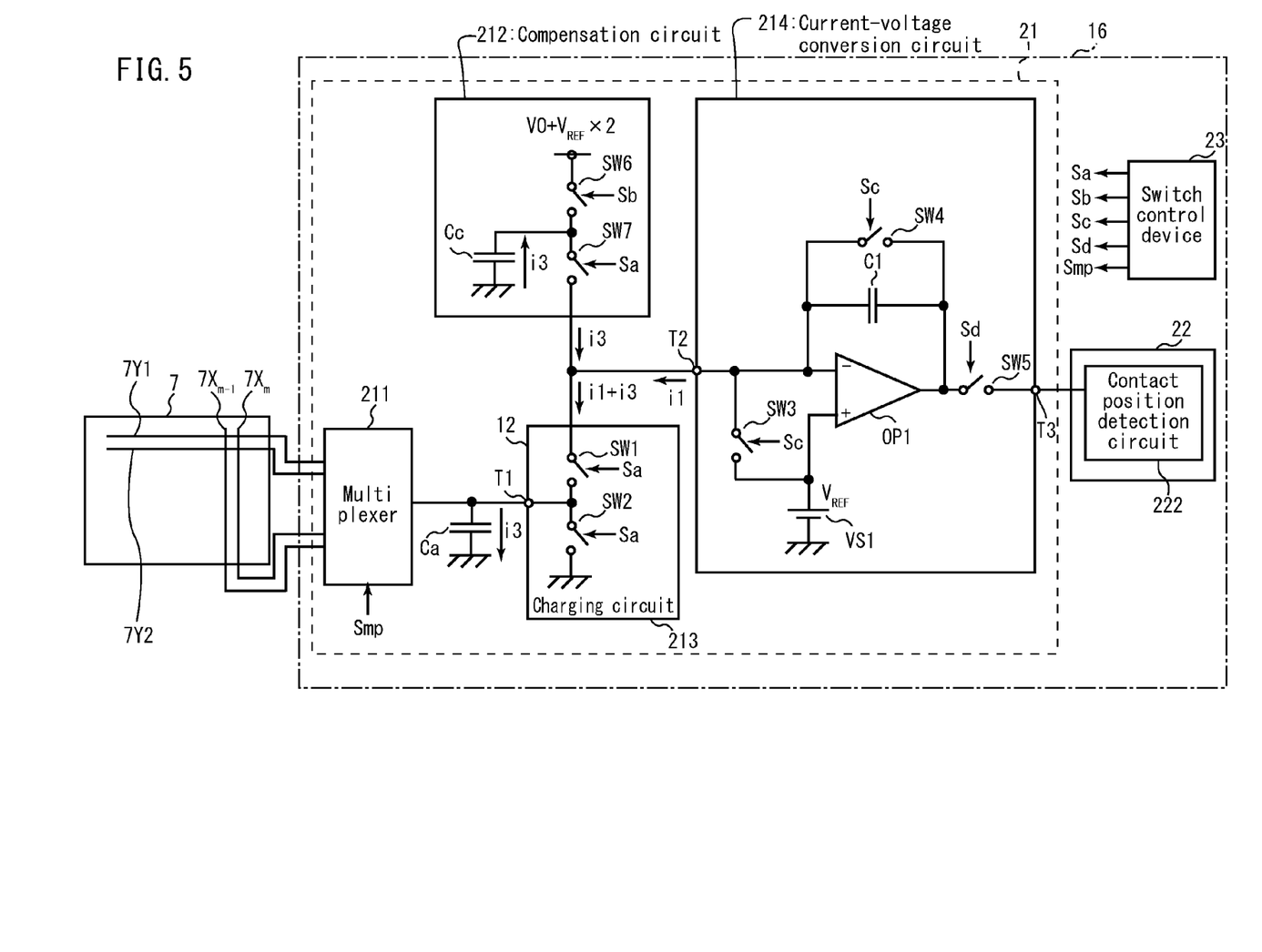
FIG. 5 is a circuit diagram showing the internal configuration of the touch sensor circuit.

Next is a description of the configuration of the touch sensor circuit 16. FIG. 5 is a circuit diagram showing the internal configuration of the touch sensor circuit 16. As shown in FIG. 5, the touch sensor circuit 16 includes a sensor output readout circuit 21, a coordinate computation apparatus 22, and a switch control device 23 (sensor control circuit).

The sensor output readout circuit 21 outputs a signal that expresses the capacitances of the electrode patterns 7X1, 7X2, ... 7Xm and the electrode patterns 7Y1, 7Y2, ... 7Yn of the touch sensor unit 7. The coordinate computation apparatus 22 obtains the coordinates of the position where a contact body came into contact with the electrode patterns 7X1, 7X2, ... 7Xm and the electrode patterns 7Y1, 7Y2, ... 7Yn based on output signal values from the sensor output readout circuit 21. The switch control device 23 controls the operation of the sensor output readout circuit 21 by supplying control signals to various types of switches and the like of the sensor output readout circuit 21.

The sensor output readout circuit 21 includes a multiplexer 211, a compensation circuit 212, a charging circuit 213, and a current-voltage conversion circuit 214.

The multiplexer 211 selectively and sequentially connects the output from the electrode patterns 7X1, 7X2, ... 7Xm and the electrode patterns 7Y1, 7Y2, ... 7Yn of the touch sensor unit 7 to the charging circuit 213 one at a time. Specifically, the multiplexer 211 divides one sensor cycle into (m+n) periods and selects one electrode pattern in each period. The selection of electrode patterns in the multiplexer 211 is controlled with a selection signal Smp that is supplied from the switch control device 23.

The charging circuit 213 includes switching elements SW1 and SW2. The switching element SW1 switches between connection and disconnection of a terminal T1 of the charging circuit 213 and the current-voltage conversion circuit 214. The switching element SW2 switches between connection and disconnection of the terminal T1 and a ground voltage. The switching of the switching elements SW1 and SW2 is controlled with control signals Sa and Sb that are supplied from the switch control device 23.

The compensation circuit 212 includes a capacitor Cc and switching elements SW6 and SW7. The switching element SW6 switches between connection and disconnection of one terminal of the capacitor Cc and a power terminal to which the voltage $(V_0+V_{REF} \times 2)$ is applied. The switching element SW7 switches between connection and disconnection of the one terminal of the capacitor Cc and the switching element SW1 of the charging circuit 213. The other terminal of the capacitor Cc is held at the ground potential. The capacitance of the capacitor Cc is set at the same capacitance as that of a parasitic capacitor Ca formed between the electrode patterns of the touch sensor unit 7 and the terminal T1 of the charging circuit 213. In order to compensate for a current i3 flowing to the parasitic capacitor Ca, the compensation circuit 212 supplies a current i3 having the same magnitude toward the touch sensor unit 7 via the switching element SW1.

The current-voltage conversion circuit 214 includes a capacitor C1, a differential amplifier OP1, and switching elements SW3, SW4, and SW5. The capacitor C1 functions as a charge storage portion for storing charge. One terminal of the capacitor C1 is connected to one of the two input terminals of the differential amplifier OP1. The other input terminal of the differential amplifier OP1 is connected to a power terminal VS1 to which a voltage $V_{REF}$ is applied. The other terminal of the capacitor C1 is connected to the output terminal of the differential amplifier OP1.

The switching element SW3 switches between connection and disconnection of the terminal of the capacitor C1 that is connected to the input terminal of the differential amplifier OP1 and the power terminal VS1 to which the voltage $V_{REF}$ is applied. The switching element SW4 switches between connection and disconnection of the two terminals of the capacitor C1. The switching of the switching elements SW3 and SW4 is controlled with a control signal Sc that is supplied from the switch control device 23.

The switching element SW5 switches between connection and disconnection of the output terminal of the differential amplifier OP1 and the coordinate computation apparatus 22. The switching of the switching element SW5 is controlled with a control signal Sd that is supplied from the switch control device 23.

The coordinate computation apparatus 22 includes a contact position detection circuit 222. The contact position detection circuit 222 calculates the coordinates of a position that was touched by a pen, a finger, or the like based on an output signal from a terminal T3 of the current-voltage conversion circuit 214.

The following describes a coordinate position detection operation performed by the touch sensor circuit 16.

First, the switch control device 23 puts the switching elements SW2, SW3, SW4, and SW6 into the ON state, and puts the switching elements SW1, SW5, and SW7 into the OFF state. In this state, the voltage of the terminal T1 is set to $V_0$ (ground voltage), and the potential difference between the two terminals of the capacitor Cc is set to $V_0+2V_{REF}$. Also, the two terminals of the capacitor C1 are set to the voltage $V_{REF}$. At this time, the potential difference between the two terminals of the capacitor C1 is 0 V.

Next, the switch control device 23 puts the switching elements SW1, SW5, and SW7 into the ON state, and puts the switching elements SW2, SW3, SW4, and SW6 into the OFF state. In this state, the capacitor C1 is connected to, among the electrode patterns of the touch sensor unit 7, the electrode pattern that was selected by the multiplexer 211. If a contact body such as a finger or a pen is in contact with the electrode pattern at this time, a current flows to the contact body, and the amount of charge stored in the capacitor C1 changes. The current i3 that flows to the parasitic capacitor Ca at this time is compensated for by the current i3 having the same magnitude that flows from the capacitor Cc. The differential amplifier OP1 outputs a voltage signal that corresponds to the amount of charge stored in the capacitor C1. Accordingly, the voltages of the signal output from the terminal T3 of the current-voltage conversion circuit 214 differ from each other depending on whether a contact body is in contact with the electrode pattern of the touch sensor unit 7 and a difference in the permittivity or the like of the contact body.

Accordingly, the coordinate computation apparatus 22 can detect whether a contact body is in contact with the electrode pattern of the touch sensor unit 7 in accordance with the output signal from the terminal T3 of the current-voltage conversion circuit 214. For example, it is possible to measure in advance and store the value of the output signal from the terminal T3 of the current-voltage conversion circuit 214 in the case where nothing is in contact with the electrode patterns of the touch sensor unit 7, and detect whether contact was made by comparing that value with the values of the output signal.

The coordinate computation apparatus 22 includes a memory (not shown) that stores the values of the output signal from the terminal T3 of the current-voltage conversion circuit 214. As mentioned above, in one sensor cycle (one instance of scanning), the multiplexer 211 sequentially selects (m+n) electrode patterns, which is the sum of the X-direction electrode patterns 7X1, 7X2, . . . 7Xm and the Y-direction electrode patterns 7Y1, 7Y2, . . . 7Yn. Accordingly, (m+n) signal values are obtained as the values of the output signal from the terminal T3 of the current-voltage conversion circuit 214 in one sensor cycle. The coordinate computation apparatus 22 detects the contact position where a contact body came into contact based on these (m+n) signal values. For example, if it was determined that contact was made at the electrode pattern 7X1 among the X-direction electrode patterns 7X1, 7X2, . . . 7Xm, and it was determined that contact was made at the Y-direction electrode pattern 7Y1 as well, it can be determined that a finger, a pen, or the like is in contact in the vicinity of the intersection between the X-direction electrode pattern 7X1 and the Y-direction electrode pattern 7Y1. Note that the number of contact points that are detected in one sensor cycle is not limited to one.

Figure 6:
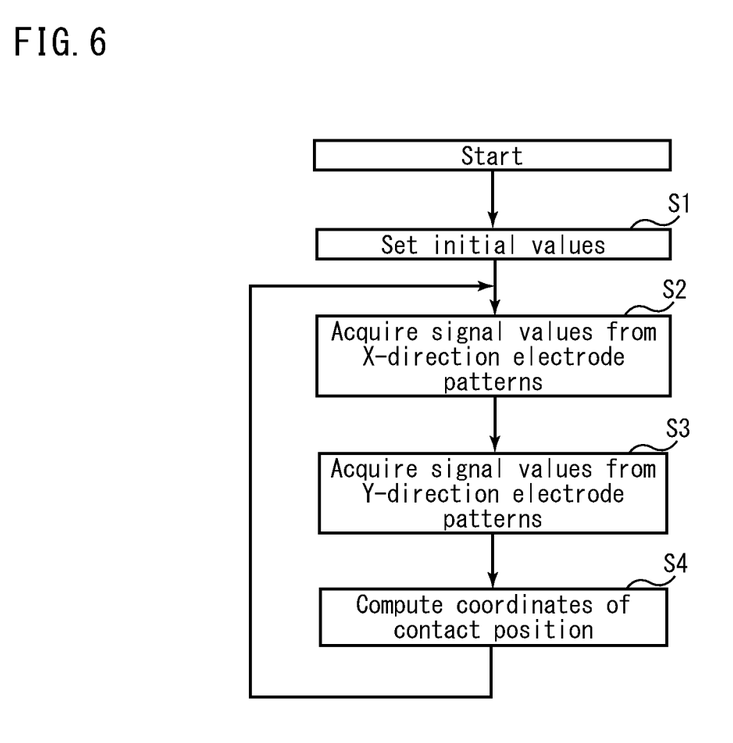
FIG. 6 is a flowchart showing an example of operations performed by the touch sensor circuit.

Next is a description of operations for driving the display panel 10 and operations for driving the touch sensor unit 7 in the display device with a touch sensor 20 of the present embodiment. FIG. 6 is a flowchart showing an example of operations performed by the touch sensor circuit 16.

As shown in FIG. 6, operation of the touch sensor circuit 16 starts when a power supply is turned on. First, various types of initial values are set (step S1).

Next, in the sensor output readout circuit 21, the multiplexer 211 sequentially selects the X-direction electrode patterns 7X1, 7X2, . . . 7Xm in accordance with the control signal Smp from the switch control device 23. These electrode patterns are thus sequentially connected to the charging circuit 213, and m output signal values that correspond to the capacitances of the electrode patterns are obtained (step S2). The m output signal values that were obtained in step S2 are stored in a memory (not shown) that is provided within or externally to the coordinate computation apparatus 22.

The multiplexer 211 then sequentially selects the Y-direction electrode patterns 7Y1, 7Y2, . . . 7Yn in accordance with the control signal Smp from the switch control device 23. These electrode patterns are thus sequentially connected to the charging circuit 213, and n output signal values that correspond to the capacitances of the electrode patterns are obtained (step S3). The n output signal values that were obtained in step S3 are stored in the memory (not shown) that is provided within or externally to the coordinate computation apparatus 22.

As a result of the processing of the above steps S2 and S3, (m+n) output signal values are stored in the aforementioned memory.

Next, in the coordinate computation apparatus 22, the contact position detection circuit 222 obtains the coordinates of the position being touched by a contact body by comparing a predetermined threshold value with each of the (m+n) output signal values that were obtained as described above (step S4). The predetermined threshold value is, for example, a value obtained by giving a margin as necessary to the output signal value from the sensor output readout circuit 21 in the case where nothing comes into contact with the electrode patterns.

The processing of steps S2 to S4 is thereafter repeated.

Note that in the present embodiment, the number of electrode patterns (m+n) and the resolution of the output data from the sensor output readout circuit 21 are set such that while the processing of steps S2 and S3 is being executed, a switch does not occur in the polarity of the common voltage (COM voltage) that is supplied to the counter electrode 5, that is to say, such that one scan cycle is completed within the inversion cycle of the COM voltage. More precisely, for example, the multiplexer 211 starts the selection of the first electrode pattern 7X1 among the aforementioned (m+n) electrode patterns after the falling of a pulse 51 of the horizontal synchronization signal shown in FIG. 3, and ends the selection of the last electrode pattern 7Yn before the falling of a pulse 52 that is subsequent to the pulse 51.

Note that the time required to read out signals from all of the (m+n) electrode patterns depends on the number of electrode patterns (m+n) and the resolution of the output data from the sensor output readout circuit 21. For example, if the output data from the sensor output readout circuit 21 is 12-bit data (4096 levels), a longer period of time is required to read out signals from the electrode patterns compared to the case where the output data is 8-bit data (256 levels).

In this way, the touch sensor circuit 16 acquires output signal values from the electrode patterns 7X1, 7X2, . . . 7Xm and 7Y1, 7Y2, . . . 7Yn while avoiding the moment when there is a switch in the polarity of the common voltage (COM voltage) that is supplied to the counter electrode 5. Accordingly, the signal values output from the touch sensor circuit 16 do not contain noise that originates from the polarity inversion of the COM voltage.

As described above, the present embodiment enables obtaining touch sensor output that has a high S/N ratio and does not contain noise originating from the polarity inversion of the COM voltage.

Figure 7:
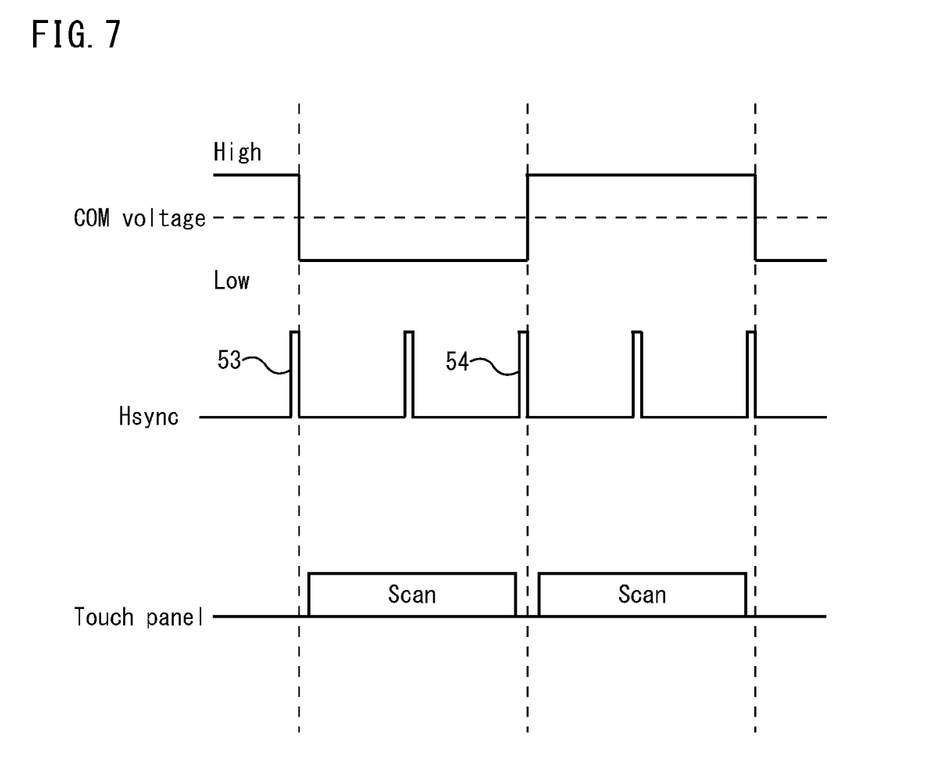
FIG. 7 is a timing chart showing the relationship between a common voltage (COM voltage) that is applied to a counter electrode of a display panel, a horizontal synchronization signal, and a scan operation in a touch sensor circuit.

Note that although the example where the polarity of the COM voltage inverts once each horizontal synchronization period is described in the present embodiment, it is also possible to implement a configuration such as so-called two line inversion driving in which the polarity of the COM voltage is determined once every two horizontal synchronization periods as described above, for example. In this case, it is sufficient that, as shown in FIG. 7, the selection of the first electrode pattern 7X1 among the above-described (m+n) electrode patterns starts after the falling of a pulse 53 of the horizontal synchronization signal, and the selection of the last electrode pattern 7Yn ends before the falling of a pulse 54 that is two pulses after the pulse 53.

Although embodiments of the present invention have been described above, the above embodiments are merely illustrative examples for carrying out the present invention. Accordingly, the present invention is not intended to be limited to the above embodiments, and appropriate modifications can be made to the various types of embodiments described above without departing from the gist of the present invention.

For example, the above description gives the example of a configuration in which a contact position is detected using the fact that the capacitances of electrode patterns change when a finger, a pen, or the like comes into contact. However, the configuration of the touch sensor unit is not limited to this kind of capacitive coupling system, and any other system can be applied. Also, there is no limitation to a contact-based sensor, and the present invention is also applicable to a sensor that electrically or optically detects the approach of a finger, a pen, or the like.

Also, the above description gives the example of a configuration in which the electrode patterns 7X1, 7X2, ... 7Xm and the electrode patterns 7Y1, 7Y2, ... 7Yn are sequentially selected in one sensor cycle by one multiplexer. In other words, the above description gives the example of a configuration in which the touch sensor circuit 16 includes one sensor output readout circuit 21. However, a configuration is possible in which one sensor output readout circuit 21 is provided for the electrode patterns 7X1, 7X2, ... 7Xm and one sensor output readout circuit 21 is provided for the electrode patterns 7Y1, 7Y2, ... 7Yn. This configuration enables simultaneous parallel scanning of the electrode patterns 7X1, 7X2, ... 7Xm and the electrode patterns 7Y1, 7Y2, ... 7Yn.

INDUSTRIAL APPLICABILITY

The present invention is industrially applicable as a display device with a touch sensor.

The invention claimed is:

1. A display device with a touch sensor comprising:
    a display panel that has an active matrix substrate in which a plurality of pixel electrodes are provided, a display medium layer, and a counter substrate in which a counter electrode that opposes the plurality of pixel electrodes is provided;
    a display panel driving circuit that supplies a display signal voltage to the plurality of pixel electrode and supplies a common voltage that undergoes cyclical polarity inversion to the counter electrode;
    a touch sensor unit that is disposed on a surface of the display panel on the counter substrate side and includes a plurality of sensor electrodes, an electrical characteristic of the sensor electrodes changing when touched by a contact body;
    a sensor output readout circuit that is sequentially connected to each of the sensor electrodes and outputs signal voltages that correspond to the electrical characteristics of the connected sensor electrodes;
    a sensor control circuit that supplies a control signal to the sensor output readout circuit; and
    a coordinate computation circuit that detects a position in the touch sensor unit that was touched by the contact body based on the signal voltages output from the sensor output readout circuit, wherein
    the sensor control circuit causes a scan operation, in which the sensor output readout circuit is sequentially connected to all of the sensor electrodes of the touch sensor unit and outputs the signal voltages, to start after the common voltage has switched from a first polarity to a second polarity, and to end before the common voltage returns to the first polarity,
    the sensor electrodes include a first sensor electrode group in which a plurality of sensor electrodes are aligned in a first axis direction with respect to coordinates in the touch sensor unit, and a second sensor electrode group in which a plurality of sensor electrodes are aligned in a second axis direction with respect to coordinates in the touch sensor unit, and
    the coordinate computation circuit determines a coordinate in the first axis direction of the position touched by the contact body based on the signal voltages that were output when the sensor output readout circuit was connected to the sensor electrodes that belong to the first sensor electrode group, and determines a coordinate in the second axis direction of the position touched by the contact body based on the signal voltages that were output when the sensor output readout circuit was connected to the sensor electrodes that belong to the second sensor electrode group.

2. The display device with a touch sensor according to claim 1, wherein the polarity of the common voltage inverts once each horizontal period.

3. The display device with a touch sensor according to claim 1, wherein the polarity of the common voltage inverts once every two horizontal periods.

* * * * *